Dec. 22, 1953   C. W. LINCOLN ET AL   2,663,542
JACK

Filed Aug. 6, 1949   2 Sheets-Sheet 1

Inventors
Clovis W. Lincoln,
Godfrey G. Kearful &
David O. Galonska

By Spencer, Willits, Helmig & Baillio
Attorneys

Dec. 22, 1953     C. W. LINCOLN ET AL     2,663,542
JACK
Filed Aug. 6, 1949     2 Sheets-Sheet 2
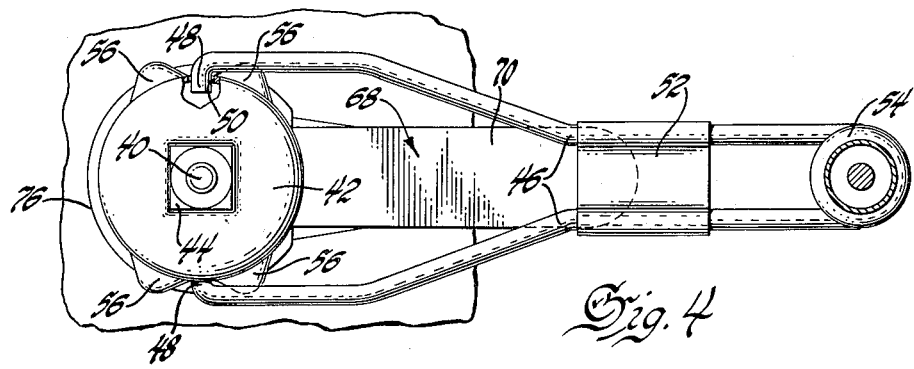
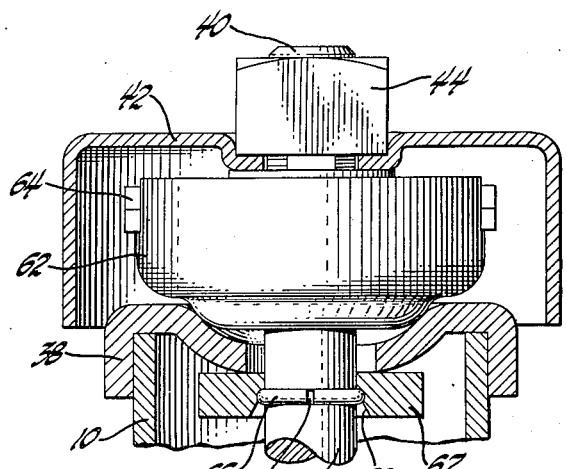
Inventors
Clovis W. Lincoln,
Godfrey G. Kearful &
David Q. Galonska
By Spencer, Willits, Helwig & Baillio
Attorneys

Patented Dec. 22, 1953

2,663,542

UNITED STATES PATENT OFFICE 2,663,542

JACK

Clovis W. Lincoln, Godfrey G. Kearful, and David A. Galonska, Saginaw, Mich., assignors to General Motors Corporation, Detroit, Mich., a corporation of Delaware Application August 6, 1949, Serial No. 108,906

9 Claims. (Cl. 254—100)

This invention relates to jacks and more particularly to an improved bumper jack.

The bumper jack which is illustrative of the invention consists of a tubular column mounted on a supporting foot. At the top of the column a cap provides a support for the jack screw. A handle is connected to the jack screw above the cap and a special bearing supports the load-carrying screw on ball bearings when the load is being raised and on a plane bearing when the load is lowered to provide sufficient friction to hold the load in raised position. This bearing and handle is fully described in co-pending application Serial Number 675,538, filed June 10, 1946, by Godfrey G. Kearful et al. which has matured into Patent 2,609,178. The column has a longitudinal slot on the back side. The load supporting hook extends from the front side of the column and has a cylindrical portion surrounding the column. From the inside of the rear portion of the cylindrical part of the hook an abutment extends into the tube and has an annular end part. The screw passes through the center of the annular abutment and has a ball nut below the abutment to raise and lower the hook.

The object of the invention is to provide a column supported jack, with a load member extending from one side of the column to support the load and extending into a slot at the other side of the column to engage the jack operating means.

Another object of the invention is to provide a load supporting member slidably mounted on a slotted column which loads the column so that it tends to hold the column closed, and loads the slotted side in tension and the full side in compression.

Another object of the invention is to provide an improved snap ring lock to maintain the screw in the column and an improved fastener to hold the hook on the ball nut.

These and other objects will be more apparent from the following drawings and description of a preferred embodiment of the invention.

In the drawings—

Figure 4 is a partial sectional view of Figure 1 on the line 4—4.

Figure 5 is an enlarged partial view showing the snap ring.

Figure 6 is a partial perspective view with parts broken away to show the hook mounted on the column and supported by the screw and nut gear.

Figure 7 is a perspective view of a fastener.

Figures 1, 2, 3:
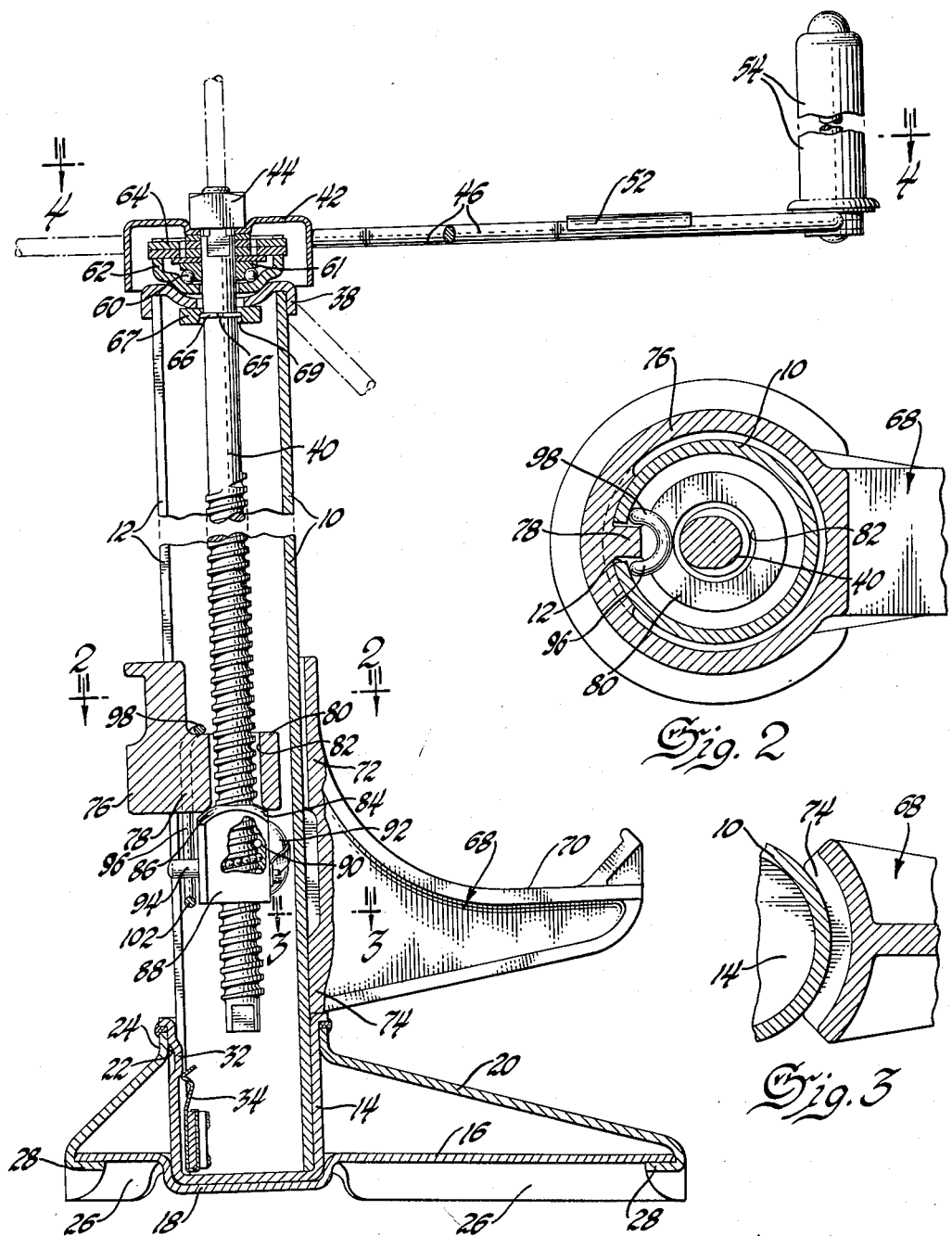
Figure 1 is a sectional view of the jack.
Figure 2 is a partial sectional view of Figure 1 on the line 2—2.
Figure 3 is a partial sectional view of Figure 1 on the line 3—3.

The bumper jack illustrated in the drawings consists of a main supporting column 10 of cylindrical form having a longitudinal slot 12 at the back side of the column opposite the hook at the front of the column. The lower end of the column is supported in a cup 14 which forms the center portion of the supporting foot. The supporting foot consists of a base plate 16 which has a recess 18 to receive the lower end of the cup 14. The cup 14 is held in vertical position by a brace plate 20. The brace plate 20 has a substantially eccentric conical shape with an aperture 22 at the apex of the cone surrounded by a flange 24 which is welded to the top of the cup 14. The conical portion of the brace plate 20 extends downward and outward to the base plate 16 and has vertically extending feet 26 extending below the base plate. Intermediate portions 28 of the feet 26 are crimped inward to form a flange which engages and secures the base plate 16 in position. It will be noted that the supporting foot extends further from the front side of the column where the load supporting hook will be located. A boss 32 is stamped into the upper portion of the side wall of the cup 14, and fits into the slot 12 of the column to prevent rotation of the column in the foot. A leaf spring 34 is secured to the lower end of the column, and engages the boss 32 to vertically hold the column in the cup 14 of the supporting foot.

A cap 38 having a central aperture surrounded by a spherical seat is secured to the upper end of the column 10, in order to support the jack screw 40 which passes through the aperture. A hub 42 having a square aperture is non-rotatably secured to the square end of the screw 40 by nut 44. As best shown in Figure 4 a handle consisting of a pair of wires or rods 46 with inwardly bent pintle portions 48 at one end of the rods extends into diametrically opposed apertures 50 in the hub 42. The handle rods 46 are secured together by the brace 52 and have a hand grip 54 pivotally mounted at the other end. The hub 42 has handle stop elements 56 stamped in the side wall of the hub 42 adjacent the apertures 50. These stop elements 56 frictionally retain the handle in horizontal position, but allow it to be folded to other more convenient positions as shown by the partial dot-and-dash lines in Figure 1. This handle construction and the brake construction are disclosed in Patent 2,609,178 referred to above. When the screw is rotated by the handle to lift the load it is supported for rotation on the ball bearing 60, which has a race 61 secured to the screw and the bearing plate 62 having a spherical seat engaging the seat of cap 38. The bearing plate 62 remains stationary with respect to the cap 38. However, when the direction of rotation of the screw is reversed to lower the load a ratchet 64 between the screw and bearing plate 62 moves the bearing plate with the screw, so that the ball bearing 60 is rendered inoperative, and the relative rotation occurs between the bearing plate 62 and the cap 38. The increased friction of this plane bearing structure prevents the weight of the load from lowering the jack.

The screw 40 is retained within the column by a stop arrangement consisting of an annular groove 65 in the screw 40 immediately under the cap 38. A snap ring 66 fits into the groove 65 and is retained in place by a washer 67 having an internal recess 69 at the lower edge, so that the washer not only engages the top of the ring to hold the washer in position, but also engages the outside of the ring to hold the ring 66 in the groove 65.

The load supporting hook 68 extends outwardly from the front of the jack column 10 over the extended portion of the foot, and has a load supporting pad 70 adjacent the end. The hook 68 has an upper guide pad 72 and a lower guide pad 74 engaging the front face of the column to provide a more even distribution of the load. At the upper guide pad 72 and hook structure is extended to provide a cylindrical collar 76 extending around the column. At the rear portion of the collar 76 a tongue 78 extends through the slot 12 of the column, and has an enlarged abutment 80 located inside the column having a central aperture 82 through which the screw 40 passes.

The lower surface of the abutment 80 has a spherical surface 84 concentric with the aperture 82 which seats on a spherical surface 86 on the top of the ball nut 88. The ball nut 88 is of conventional construction with internal helical grooves 90 and a return passage 92 to provide for the circulation of the balls. A pin 94 extends from the rear face of the ball nut into slot 12 to prevent rotation of the ball nut, but to allow sliding movement of the ball nut within the column.

Excessive separation between the hook 68 and the ball nut 88 is prevented by a fastener 96 engaging the upper edge of the tongue 78 and abutment 80 with a hook 98, and engaging the pin 94 on the ball nut 88 with the hook 102.

The load on this hook tends to stabilize and stiffen the jack supporting column. The hook 68 has a collar portion 76 surrounding the column 10 to prevent spreading and distortion of the column. There is a tendency to close the slot 12 in the column, but this distortion is resisted by the tongue 78 which fills an extended portion of the slot. At the front where the column is subjected to compressive stresses the full section of the tubular column is employed for the maximum strength. The slot 12 is positioned in the column in the region where tensile stresses are impressed on the column. This is the region of minimum stress, and it may be lightened without weakening the column with regard to the load applied by this hook. The guide pads 72 and 74 are also spaced apart to reduce the bending load on the column. The hook 102 which prevents excessive separation between the hook and nut, provides for limited relative separation, so that freedom of rocking movement between the hook 68 and the nut 88 on the spherical seats 84 and 86 is maintained. The column 10 is also tilted toward the slotted side to counteract the couple produced by the eccentric load on the hook 68.

The preferred embodiment of the invention is illustrated above. Other modifications of the invention may be made within the scope of the appended claims.

We claim:

1. In a jack, a supporting column having a slot, a screw rotatably supported on said column, a nut on said screw, a load hook supported on said nut, a member extending from said nut into said slot, and a fastener hook engaging said load hook and said member to prevent excessive separation of said load hook and nut.

2. In a jack, a support column having a slot at one side, a load supporting hook having a load pad on the other side and a guide sleeve surrounding said column and an abutment portion extending into said slot, a screw rotatably supported in said column, a nut on said screw engaging said abutment portion, and means on said nut sliding in said slot to prevent rotation of said nut.

3. In a jack, a support column having a longitudinal slot at one side, a load supporting hook having a load pad extending from the other side of said column, said hook having a sleeve portion surrounding said column, a tongue portion extending from said sleeve into said slot, an apertured abutment on the end of said tongue, a screw rotatably supported on said column and extending through said apertured abutment, a nut on said screw below said abutment, and means to prevent rotation of said nut with respect to said screw.

4. In a jack, a support column having a longitudinal slot at one side, a load supporting hook having a load pad extending from the other side of said column, said hook having a sleeve portion surrounding said column, a tongue portion extending from said sleeve into said slot, said tongue extending longitudinally in said slot and having the same width as said slot to maintain the slot spacing, an apertured abutment on the end of said tongue, a screw rotatably supported on said column and extending through said apertured abutment, a nut on said screw below said abutment, and means to prevent rotation of said nut with respect to said screw.

5. In a jack, a support column having a longitudinal slot at one side, a load supporting hook having a load pad extending from the other side of said column, said hook having a sleeve portion surrounding said column, a tongue portion extending from said sleeve into said slot, an apertured abutment on the end of said tongue, a screw rotatably supported on said column and extending through said apertured abutment, a nut on said screw below said abutment, and means on said nut to prevent rotation of the nut, and means to prevent separation of said nut and hook.

6. In a jack, a supporting column having a slot, a screw rotatably supported on said column, a nut on said screw, a load hook supported by said nut, an annular groove in said screw, a split ring in said groove, and an annular abutment having a recess in the inner lower edge positioned on said screw with said ring in said recess.

7. In a jack, a supporting column having a slot, a cap secured to said column, a screw rotatably supported on said column by a bearing engaging said cap, a nut on said screw, a load hook supported by said nut, an annular groove in said screw below said cap, a split ring in said groove, and an annular abutment having a recess in the inner lower edge positioned on said screw with said ring in said recess to retain said screw in said column.

8. In a jack, a supporting column having a slot, a cap secured to the top of said column, a screw rotatably supported on said column by a bearing engaging said cap, a nut on said screw, means on said nut entering said slot to prevent rotation of said nut, a load hook supported by said nut, an annular groove in said screw below said cap, a split ring in said groove, and an annular abutment having a recess in the inner lower edge positioned on said screw with said ring in said recess for engagement with the lower edge of said cap to retain said screw in said column.

9. In a lifting jack, a load supporting column having a longitudinal slot in one side portion, a load supporting member having a guide portion extending around said column, said load supporting member having a portion extending through said longitudinal slot and having an abutment portion within said column, means supported on said column and engaging said abutment portion to raise and lower said load supporting member, and said load supporting member having a load engaging portion extending outwardly from said column on a solid side portion diametrically opposed to said slot to place the side portion of said column having said slot in tension and the solid side portion in compression due to the off center loading on said load engaging portion.

CLOVIS W. LINCOLN.
GODFREY G. KEARFUL.
DAVID A. GALONSKA.

References Cited in the file of this patent

FOREIGN PATENTS

| Number | Country | Date |
|--------|---------|------|
| 20,617 | Austria | July 10, 1905 |